United States Patent
Fanning et al.

(10) Patent No.: US 10,540,416 B2
(45) Date of Patent: Jan. 21, 2020

(54) LINKING SOURCE CODE TO RUNNING ELEMENT

(75) Inventors: Michael C. Fanning, Redmond, WA (US); Matthew Hall, Seattle, WA (US); Gary Linscott, New York, NY (US); Felix G T I Andrew, Seattle, WA (US); Kenneth A. Showman, Redmond, WA (US); Evgeny Tvorun, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/167,229

(22) Filed: Jun. 23, 2011

(65) Prior Publication Data
US 2012/0331374 A1    Dec. 27, 2012

(51) Int. Cl.
G06F 16/957    (2019.01)
(52) U.S. Cl.
CPC .................................. *G06F 16/957* (2019.01)
(58) Field of Classification Search
CPC .................................................. G06F 17/2247
USPC ......................................................... 715/234
See application file for complete search history.

(56) References Cited

U.S. PATENT DOCUMENTS

| | | |
|---|---|---|
| 6,961,750 B1 | 11/2005 | Burd et al. |
| 6,981,211 B1 | 12/2005 | Claussen et al. |
| 7,047,318 B1 | 5/2006 | Svedloff |
| 7,207,000 B1 * | 4/2007 | Shen et al. ................... 715/207 |
| 7,316,003 B1 | 1/2008 | Dulepet et al. |
| 7,730,467 B1 | 6/2010 | Hejlsberg et al. |
| 7,895,514 B1 | 2/2011 | Edmunds et al. |
| 7,917,847 B2 | 3/2011 | Uematsu et al. |
| 7,975,020 B1 | 7/2011 | Green et al. |
| 8,020,094 B2 | 9/2011 | Mohan |
| 2002/0184264 A1 | 12/2002 | Berg et al. |
| 2002/0188636 A1 | 12/2002 | Peck et al. |

(Continued)

FOREIGN PATENT DOCUMENTS

| | | |
|---|---|---|
| CN | 1959679 A | 5/2007 |
| CN | 101587488 A | 11/2009 |

(Continued)

OTHER PUBLICATIONS

Luthra, Chandan et al. "Firebug 1.5: Editing, Debugging, and Monitoring Web Pages", Apr. 2010. pp. 41-44, 91-100.*

(Continued)

*Primary Examiner* — Shawn S Joseph
(74) *Attorney, Agent, or Firm* — Dicke, Billig & Czaja, PLLC (57) ABSTRACT

A method includes parsing a text source document to construct a document node tree such that the document node tree includes text offsets indicating the location of the text within the text source document corresponding to each node of the document node tree. The method includes constructing, from the document node tree, a Document Object Model (DOM) and a view node tree that represents the DOM. The constructing of the view node tree includes mapping the view node tree to the document node tree. The method includes providing a running representation of the DOM such that DOM elements of the DOM are linked to the text within the text source document corresponding to the DOM elements via the view node tree and the document node tree.

20 Claims, 8 Drawing Sheets

(56) References Cited

U.S. PATENT DOCUMENTS

| | | |
|---|---|---|
| 2003/0120671 A1 | 6/2003 | Kim et al. |
| 2004/0172616 A1 | 9/2004 | Rothschiller et al. |
| 2005/0039117 A1 | 2/2005 | Lwo |
| 2006/0044319 A1 | 3/2006 | Molesky et al. |
| 2006/0161841 A1 | 7/2006 | Horiuchi et al. |
| 2007/0266050 A1 | 11/2007 | Kaandorp |
| 2007/0283245 A1 | 12/2007 | Masood |
| 2008/0082911 A1 | 4/2008 | Sorotokin et al. |
| 2008/0098028 A1 | 4/2008 | Shan et al. |
| 2008/0270345 A1 | 10/2008 | Barlow et al. |
| 2009/0064091 A1 | 3/2009 | Tonkin et al. |
| 2009/0094579 A1 | 4/2009 | Na |
| 2009/0228784 A1 | 9/2009 | Drieu et al. |
| 2009/0228838 A1 | 9/2009 | Ryan et al. |
| 2010/0313149 A1 | 12/2010 | Zhang et al. |
| 2011/0099294 A1 | 4/2011 | Kapur et al. |
| 2011/0197124 A1 | 8/2011 | Garaventa |
| 2012/0331374 A1 | 12/2012 | Fanning et al. |
| 2012/0331375 A1 | 12/2012 | Fanning et al. |
| 2013/0227397 A1 | 8/2013 | Tvorun et al. |

FOREIGN PATENT DOCUMENTS

| | | |
|---|---|---|
| CN | 101685447 A | 3/2010 |
| CN | 101763432 A | 6/2010 |
| CN | 101819596 A | 9/2010 |
| CN | 101996252 | 3/2011 |
| CN | 102033954 A | 4/2011 |
| JP | 08511116 A | 11/1996 |
| JP | 2006163536 A | 6/2006 |

OTHER PUBLICATIONS

Hanselman, "MultiBrowser or CrossBrowser Testing and deconstructing Microsoft Expression Web SuperPreview," 2009.*

"NextEdit—Online Website Editor's Features", Retrieved at <<http://www.nextedit.com/features.php>>, Retrieved Date: Dec. 22, 2010, p. 1.

"MyEclipse Ajax Tools", Retrieved at <<http://www.myeclipseide.com/module-htmlpages-display-pid-57.html#2>>, Retrieved Date: Dec. 23, 2010, pp. 17.

"Expression Web 4", Retrieved at <<http://www.microsoft.com/expression/products/Web_WhatIsExpressionWeb.aspx>>, Retrieved Date: Dec. 23, 2010, pp. 3.

"Fire bug", Retrieved at <<Fire bug>>, Retrieved Date: Dec. 23, 2010, pp. 6.

"Internet Explorer Developer Toolbar", Retrieved at <<Internet Explorer Developer Toolbar>>, Jun. 7, 2010, pp. 2.

"ItsNat Overview", Retrieved at <<http://itsnat.sourceforge.net/index.php?_page=overview>>, Jan. 29, 2010, pp. 5.

"Developer Tools for Google Chrome", Retrieved at <<Developer Tools for Google Chrome>>, Jun. 24, 2009, pp. 5.

Lin, Li Li, "Automatically Update a Web Page with Dynamic Elements" Retrieved at <<http://www.ibm.com/developerworks/web/library/wa-aj-dynamic/>>, Oct. 13, 2009, pp. 15.

Lin, Li Li, "Automatically update a Web page with dynamic elements", Retrieved at <<http://download.boulder.ibm.com/ibmdl/pub/software/dw/ajax/wa-aj-dynamic/wa-aj-dynamic-pdf.pdf>>, Oct. 13, 2009, pp. 15.

MacVittie, Lori Mac, "The Impact of AJAX on the Network", Retrieved at <<http://www.f5.com/pdf/white-papers/ajax-wp.pdf>>, Mar. 2007, pp. 1-7.

Borodin, et al., "What's New?—Making Web Page Updates Accessible", Retrieved at <<http://dub.washington.edu/djangosite/media/papers/dynamo.pdf>>, Proceedings of the 10th international ACM SIGACCESS conference on Computers and accessibility, Oct. 13-15, 2008, pp. 145-152.

"ItsNat Overview", Available at : <<http://itsnat.sourceforge.net/index.php? page=overview>>, Jan. 29, 2010, 5 pgs.

Non-Final Office Action dated Jul. 6, 2012 for U.S. Appl. No. 13/167,325, 18 pgs.

Final Office Action for U.S. Appl. No. 13/167,325 dated Feb. 6, 2013, 25 pgs.

"International Search Report", dated Feb. 27, 2013, Application No. PCT/US2012/041037, Filed Date: Jun. 6, 2012, pp. 9.

Non-Final Office Action dated Jun. 20, 2013 for U.S. Appl. No. 13/167,325, 23 pgs.

Final Office Action dated Jan. 28, 2014 for U.S. Appl. No. 13/404,391, 17 pgs.

Final Office Action (U.S. Appl. No. 13/167,325) dated Sep. 19, 2013 (18 pages).

Non-Final Office Action (U.S. Appl. No. 13/404,391) dated Oct. 9, 2013 (16 pages).

Non-Final Office Action dated Jun. 13, 2014 for U.S. Appl. No. 13/167,325, 28 pgs.

"Die Oberflache Von Quanta Kann Fast Beliebig Verandert Werden", Published on: Feb. 14, 2007 Available at: http://web.archive.org/web/20070214092244/http://spielwiese.la-evento.com/quanta2/oberflaeche.php.

"DOM Inspection", Published on: Jun. 18, 2006 Available at: http://web.archive.org/web/20060618082502/http://ajaxpatterns.org/archive/DOM_Inspection.php.

"Shot 3.png", Published on: Jun. 17, 2007 Available at: http://web.archive.org/web/20070617031137/http://quanta.kdewebdev.org/screenshots//shot3.png.

"Search Report Issued in European Patent Application No. 12864286.5", dated Jan. 26, 2015, 7 Pages.

Final Office Action for U.S. Appl. No. 13/167,325, dated Jan. 27, 2015, 23 pgs.

Non-Final Office Action for U.S. Appl. No. 13/404,391, dated Mar. 25, 2015, 29 pgs.

"Search Report Issued in European Patent Application No. 12802344.7", dated Jan. 27, 2015, 6 Pages.

"What is Firebug?", Published on: Jun. 20, 2011, Available at: http://web.archive.org/web/20110620164719/http://getfirebug.com/whatisfirebug.

Almaer, Dion, "FireDiff: Firebug Extension to Track Changes to DOM and CSS", Published on: May 12, 2011, Available at: http://web.archive.org/web/20110512095109/http://ajaxian.com/archives/firediff-firebug-extension-to-track-changes-to-dom-and-css.

"International Search Report & Written Opinion Received for PCT Patent Application No. PCT/US2012/39958", dated Aug. 23, 2013, 8 Pages.

Luthra, et al., "Firebug 1.5: Editing, Debugging, and Monitoring Web Pages", Published by Packt Publishing © 2010, Apr. 2010, 224 Pages.

"Die Oberflache Von Quanta Kann Fast Beliebig Verandert Werden", Published on: Feb. 14, 2007—Available at: http://web.archive.org/web/20070214092244/http://spielwiese.la-evento.com/quanta2/oberflaeche.php (5 pages).

Final Office Action for U.S. Appl. No. 13/404,391 dated Jul. 29, 2015 (25 pages).

Non-Final Office Action for U.S. Appl. No. 13/167,325 dated Jul. 2, 2015 (44 pages).

Non-Final Office Action dated Apr. 13, 2016 in U.S. Appl. No. 13/167,325 (48 pages).

Office Action for U.S. Appl. No. 13/167,325 dated Sep. 22, 2016 (48 pgs.).

Office Action for U.S. Appl. No. 13/404,391 dated Sep. 15, 2016 (33 pgs.).

Jianbin, Huang, "Application Programming Interface", DOM & SAX, Mar. 31, 2004, pp. 160-166. (W/o English Translation).

Final Office Action dated Jan. 6, 2016 in U.S. Appl. No. 13/167,325,— 49 pages.

"Oral Hearing Issued in European Patent Application No. 12802344.7", dated May 3, 2019, 5 Pages.

"Komodo User Guide", Retrieved From: http://community.activestate.com/files/komodo_ide_4.3.pdf, Jun. 27, 2004, 555.

"Office Action Issued in Korean Patent Application No. 10-2013-7033973", dated Jul. 11, 2018, 10 Pages.

"Office Action Issued in Korean Patent Application No. 10-2013-7033978", dated May 30, 2018, 8 Pages.

(56) References Cited

OTHER PUBLICATIONS

"Office Action Issued in European Patent Application No. 12802344.7", dated Nov. 14, 2017, 7 Pages.
"Oral Hearing Issued in European Patent Application No. 12802344.7", dated Aug. 21, 2018, 7 Pages.
"Office Action Issued in European Patent Application No. 12864286.5", dated Nov. 15, 2017, 7 Pages.
"Office Action Issued in European Patent Application No. 12864286.5", dated Jul. 25, 2018, 9 Pages.
"Final Office Action Issued in U.S. Appl. No. 13/167,325", dated Feb. 23, 2017, 69 Pages.
"Final Office Action Issued in U.S. Appl. No. 13/404,391", dated Apr. 14, 2017, 18 Pages.
"First Office Action and Search Report Issued in Chinese Patent Application No. 201280030491.3", dated Sep. 2, 2015, 14 Pages.
"Second Office Action Issued in Chinese Patent Application No. 201280030491.3", dated May 5, 2016, 7 Pages.
"Decision on Re-examination Issued in Chinese Patent Application No. 201280030637.4", dated Nov. 23, 2017, 14 Pages.
"Decision on Rejection Issued in Chinese Patent Application No. 201280030637.4", dated Dec. 15, 2016, 12 Pages.
"First Office Action and Search Report Issued in Chinese Patent Application No. 201280030637.4", dated Sep. 6, 2015, 17 Pages.
"Fourth Office Action Issued in Chinese Patent Application No. 201280030637.4", dated Aug. 24, 2018, 3 Pages.
"Second Office Action Issued in Chinese Patent Application No. 201280030637.4", dated Feb. 29, 2016, 17 Pages.
"Third Office Action Issued in Chinese Patent Application No. 201280030637.4", dated Aug. 30, 2016, 15 Pages.
"Office Action Issued in Japanese Patent Application No. 2014-516982", dated Oct. 29, 2015, 8 Pages.
"Office Action Issued in Japanese Patent Application No. 2014-516993", dated Oct. 2, 2015, 9 Pages.
Jens, Kilgenstein, "Arboreal—OOM-Model mit Firebug verstehen", Retrieved From: http://www.css-einfach.de/artikel/arboreal, Jan. 11, 2013, 4 Pages.

* cited by examiner

LINKING SOURCE CODE TO RUNNING ELEMENT

CROSS-REFERENCE TO RELATED APPLICATIONS

This Utility Patent Application is related to U.S. patent application Ser. No. 13/167,325, entitled "DYNAMICALLY UPDATING A RUNNING PAGE," filed Jun. 23, 2011, and which is incorporated herein by reference.

BACKGROUND

Web development tools enable developers to diagnose HyperText Markup Language (HTML) and Cascading Style Sheets (CSS) problems. Developers can dynamically modify Document Object Model (DOM) elements including CSS selectors and see the changes reflected immediately in the running page in a browser. To permanently apply the modifications to the markup text source document from which the page originates, however, the developer needs to locate and appropriately modify the markup text or originating JavaScript associated with the desired modification. Locating the source code text associated with the desired modification may be difficult, however, since the associated markup text might not be immediately obvious or might originate in code with which a developer is not familiar.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One embodiment provides a method including parsing a text source document to construct a document node tree such that the document node tree includes text offsets indicating the location of the text within the text source document corresponding to each node of the document node tree. The method includes constructing, from the document node tree, a Document Object Model (DOM) and a view node tree that represents the DOM. The constructing of the view node tree includes mapping the view node tree to the document node tree. The method includes providing a running representation of the DOM such that DOM elements of the DOM are linked to the text within the text source document corresponding to the DOM elements via the view node tree and the document node tree.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

Figure 1:
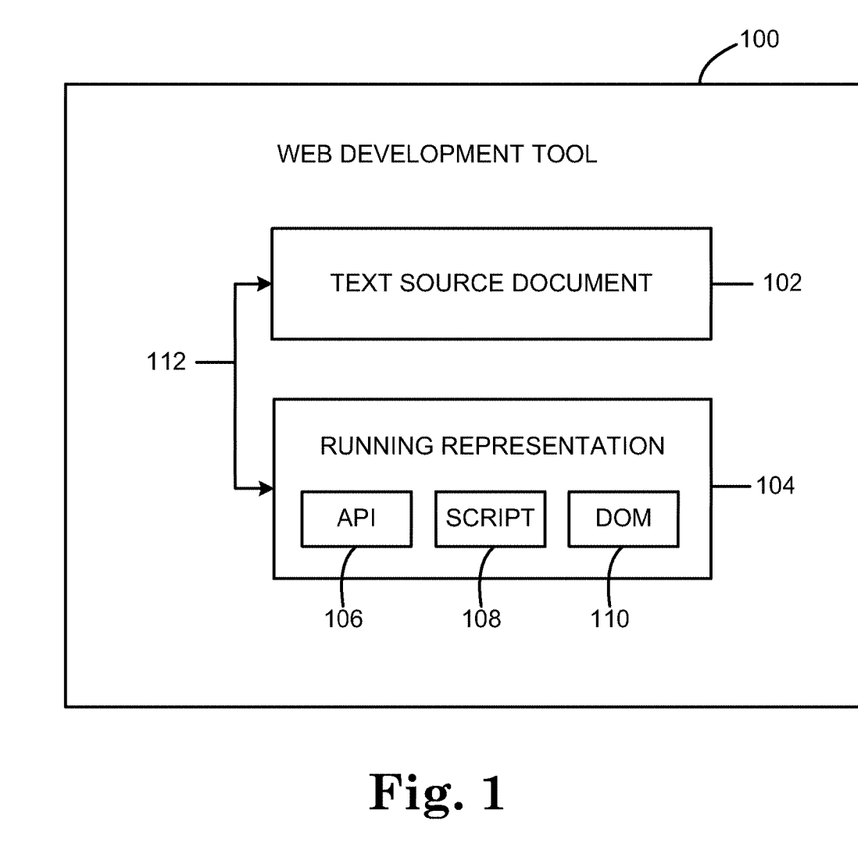
FIG. 1 is a block diagram illustrating one embodiment of a web development tool.

FIG. 1 is a block diagram illustrating one embodiment of a web development tool 100. Web development tool 100 includes a text source document 102 and a running representation 104 of the text source document. In one embodiment, the text source document 102 is opened in a web page source code editor. In other embodiments, text source document 102 or portions of the text source document 102 are displayed in a web page source code viewer. In one embodiment, the running representation 104 of text source document 102 is provided by a browser. In other embodiments, the running representation 104 of text source document 102 is provided by a designer, a property pane, or other suitable visualization of the running representation of the text source document.

Web page source code of text source document 102 is linked, via link 112, to associated Document Object Model (DOM) 110 elements in a running page instance of the web page as represented by running representation 104. Therefore, by selecting or highlighting a DOM element within running representation 104, the web page text associated with the selected or highlighted DOM element is selected or highlighted within text source document 102. Likewise, by selecting or highlighting a portion of the web page text within text source document 102, the DOM element or elements associated with the selected or highlighted portion of the web page text is selected or highlighted within running representation 104. In this way, a web page developer can instantly match DOM elements as they are represented in a running instance of the web page with the web page text source code that defines the DOM elements.

In one embodiment, text source document 102 is opened in a source code editor, which includes any suitable text editor suitable for opening, creating, editing, and saving web page text source documents. In one embodiment, the web page text source documents that can be edited by the source code editor include markup text, such as HyperText Markup Language (HTML), Cascading Style Sheets (CSS), Extensible Markup Language (XML), and/or Extensible HyperText Markup Language (XHTML). The web page text source documents may also include JavaScript or JScript. As used herein, "JS" is used to refer to both JavaScript and JScript. In other embodiments, the source code editor is suitable for opening, creating, editing, and saving web page text source documents including other suitable web page markup text and scripting languages. In one embodiment, the source code editor supports multiple instances of web page text source documents such that related or linked web page text source documents may be simultaneously opened within the source code editor.

In one embodiment, running representation 104 is a web browser suitable for representing a DOM 110. In one embodiment, the browser is a World Wide Web Consortium (W3C) compliant web browser. In one embodiment, the browser provides a browser agnostic representation of a DOM 110 such that the representation of the DOM 110 does not depend on any particular browser, such as Internet Explorer, FireFox, Chrome, Safari, or Opera. In another embodiment, the browser is selected such that the representation of the DOM 110 is based on the selected browser. The browser may include an option for the user to select a particular browser, such as Internet Explorer, FireFox, Chrome, Safari, or Opera, on which to base the representation of the DOM 110. In one embodiment, the browser supports multiple instances of DOMs such that related or linked web pages may be simultaneously running within the browser.

Running representation 104 may also include running script 108 and an Application Programming Interface (API). Script 108 and API 106 may modify DOM elements of DOM 110 within running representation 104. In one embodiment, portions of text source document 102 which are no longer represented in the running representation 104 of the DOM 110 due to modifications to the running representation 104 of the DOM 110 are indicated as such via a visual indicator. In one embodiment, in response to selecting a DOM element within running representation 104, the location of the source code within text source document 102 associated with the DOM element is reported to the user.

Figure 2:
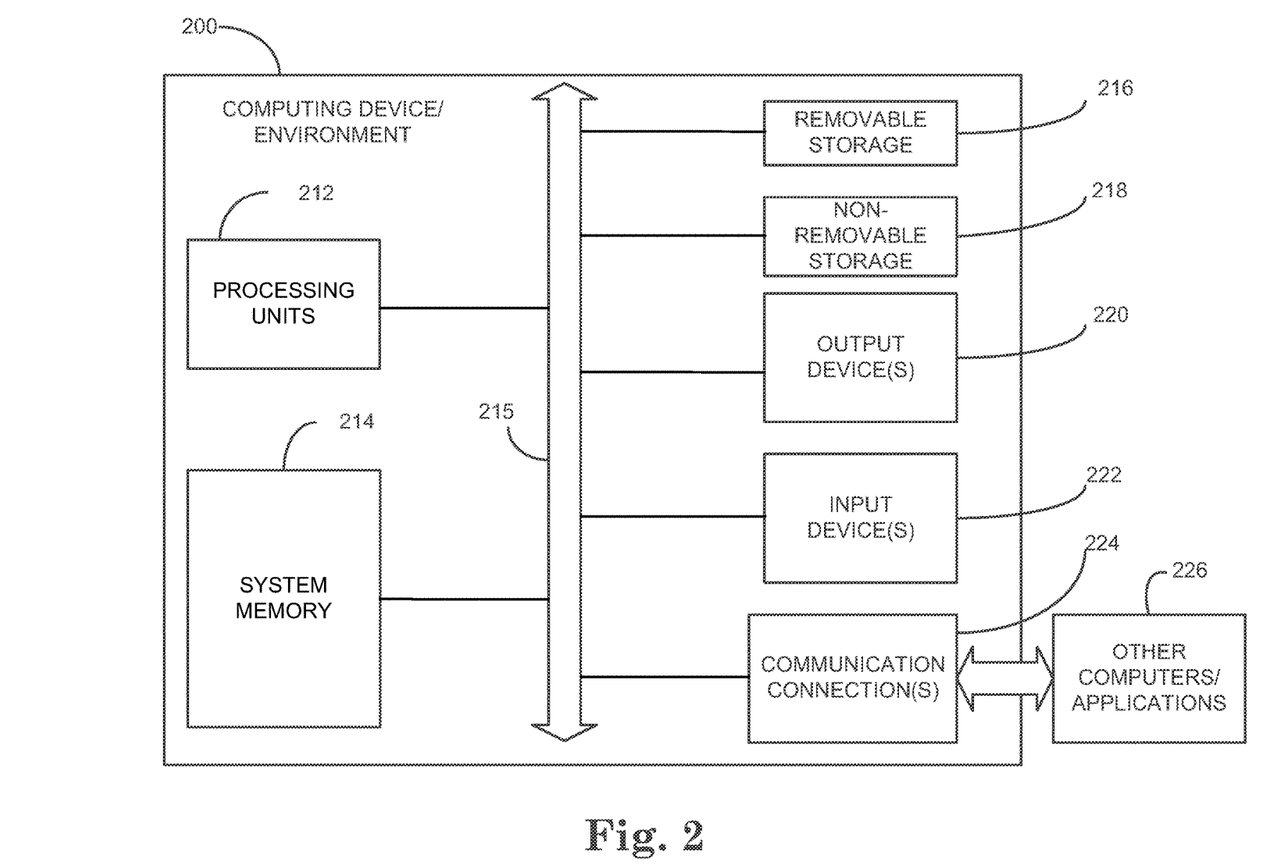
FIG. 2 is a block diagram illustrating one embodiment of a computing device/environment suitable for implementing aspects of the web development tool illustrated in FIG. 1.

FIG. 2 is a block diagram illustrating one embodiment of a computing device/environment 200 suitable for implementing aspects of web development tool 100 previously described and illustrated with reference to FIG. 1. Computing device/environment 200 includes one or more processing units 212 and system memory 214. Depending on the exact configuration and type of computing device/environment 200, memory 214 may be volatile (such as RAM), non-volatile (such as ROM, flash memory, etc.), or some combination of the two.

Computing device/environment 200 may also have additional features/functionality. For example, computing device/environment 200 may also include additional storage (removable and/or non-removable) including, but not limited to, magnetic or optical disks or tape. Such additional storage is illustrated in FIG. 2 by removable storage 216 and non-removable storage 218. Computer storage media includes volatile and nonvolatile, removable and non-removable media implemented in any suitable method or technology for storage of information such as computer readable instructions, data structures, program modules or other data. Memory 214, removable storage 216, and non-removable storage 218 are all examples of computer storage media (e.g., computer-readable storage media storing computer-executable instructions that when executed by at least one processor cause the at least one processor to perform a method). Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device/environment 200. Any such computer storage media may be part of computing device/environment 200.

The various elements of computing device/environment 200 are communicatively coupled together via one or more communication links 215. Computing device/environment 200 also includes one or more communication connections 224 that allow computing device/environment 200 to communicate with other computers/applications 226. Computing device/environment 200 may also include input device(s) 222, such as a keyboard, a pointing device (e.g., mouse), a pen, a voice input device, a touch input device, etc. Computing device/environment 200 may also include output device(s) 220, such as a display, speakers, a printer, etc.

FIG. 2 and the above discussion are intended to provide a brief general description of a suitable computing environment in which one or more embodiments may be implemented, and is not intended to suggest any limitation as to the scope of use or functionality of the embodiments.

Figure 3:
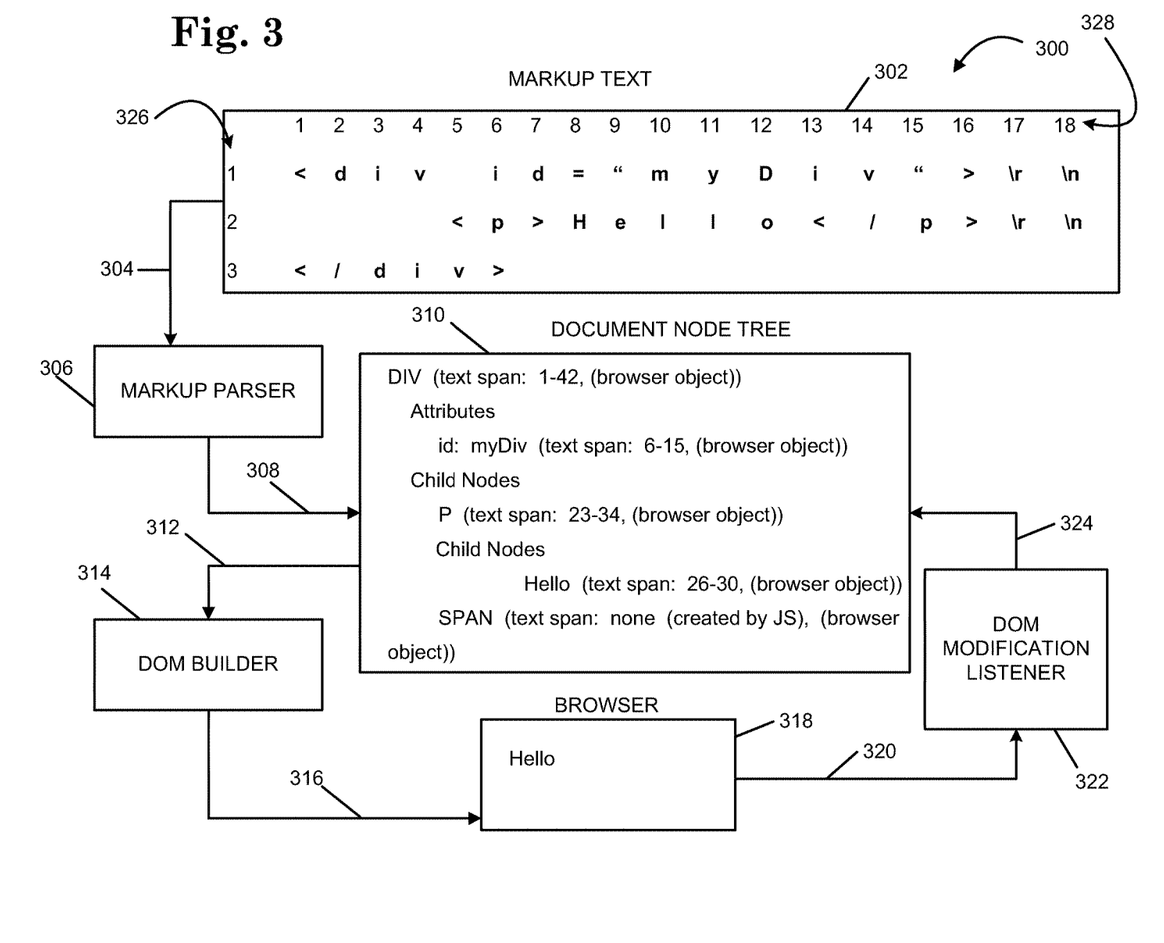
FIG. 3 is a functional block diagram illustrating one embodiment of a web development tool.

FIG. 3 is a functional block diagram illustrating one embodiment of a web development tool 300. In one embodiment, web development tool 300 provides web development tool 100 previously described and illustrated with reference to FIG. 1. Web development tool 300 includes markup text 302, a markup parser 306, a document node tree 310, a DOM builder 314, a browser 318, and a DOM modification listener 322. Markup text 302 is input to markup parser 306 as indicated at 304. Markup parser 306 outputs document node tree 310 as indicated at 308. Document node tree 310 is input to DOM builder 314 as indicated at 312. DOM builder 314 outputs a DOM to browser 318 as indicated at 316. DOM modification listener 322 tracks changes to the DOM elements within browser 318 as indicated at 320. DOM modification listener 322 outputs change information to document node tree 310 as indicated at 324.

Markup text 302 includes HTML, CSS, XML, XHTML, and/or other suitable markup text. In one embodiment, the source document including markup text 302 is opened in a source code editor. In other embodiments, web development tool 300 accesses the source document including markup text 302 without opening the source document in a source code editor. Markup text 302 defines any suitable number of objects for providing a web page. In the example illustrated in FIG. 3, markup text 302 includes HTML. The example HTML defines one object for providing a DOM element including the text "Hello".

Due to the textual nature of markup text 302, each character of markup text 302 has a corresponding line number as indicated at 326 and a corresponding relative character number for the line as indicated at 328. For example, the character "H" in markup text 302 is at line 2, character 8. Each character of markup text 302 also has a character number that indicates the position of the character relative to the beginning of markup text 302. For example, the character "H" in markup text 302 has the character number of 26 since it is the $26^{th}$ character in markup text 302. Thus, each character within markup text 302 can be located based on either a line number and position within the line or based on the character number that indicates the position of the character relative to the beginning of markup text 302. Likewise, a series of characters within markup text 302 can be located based on a range of line numbers and positions within the lines or based on a range of character numbers. As used herein, these ranges of line numbers and positions within the lines or ranges of character numbers are referred to as "text offsets."

Markup text 302 is parsed by markup parser 306 to construct document node tree 310. In one embodiment, markup parser 306 is located on the same computing device/environment as the source code editor. In another embodiment, markup parser 306 is located on a different computing device/environment from the source code editor. Markup parser 306 includes an HTML parser, a CSS parser, an XML parser, an XHTML parser, and/or other suitable markup text parsers. In one embodiment, markup parser 306 is W3C compliant. In another embodiment, markup parser 306 is based on the parser associated with a particular browser, such as Internet Explorer, FireFox, Chrome, Safari, or Opera. In other embodiments, markup parser 306 is a hybrid parser that includes the basic implementation of the parser associated with a particular browser with alterations in the parsing implementation based on knowledge of the particular browser runtime execution and/or parse behavior.

Markup parser 306 includes the source document details from markup text 302, which are relevant to web pages, in document node tree 310. In addition to HTML objects and CSS objects, markup parser 306 includes other details from markup text 302, such as doctype and in-source comments that might be interpreted by browsers. Markup parser 306 also includes text offsets in document node tree 310 indicating the location of the source document details in markup text 302. The text offsets map each node of document node tree 310 to the markup text associated with the node. In this way, a link between document node tree 310 and markup text 302 is maintained during the parsing process. This differentiates markup parser 306 from conventional parsers integrated within browsers, which often discard or transform source document details during rendering for performance reasons and do not maintain any link between the source document and the rendered document.

In the example illustrated in FIG. 3, document node tree 310 uses ranges of character numbers as text offsets. For example, document node tree 310 includes the text offset "text span: 1-42" for the parent node "DIV", which indicates the location of the object "DIV" in markup text 302. Likewise, document node tree 310 includes the text offset "text span: 6-15" for the attribute "id", the text offset "text span: 23-34 for the child node "P", and the text offset "text span: 26-30" for the child node "Hello". Thus, by including the text offsets for each object within document node tree 310, each object within document node tree 310 is mapped to the source document markup text that is associated with the object.

DOM builder 314 constructs a DOM and a view node tree that represents the DOM from document node tree 310. DOM builder 314 maps each node of the view node tree to a corresponding node of the document node tree such that each element of the DOM is linked to the associated object in document node tree 310 and thereby to the source document markup text that is associated with the object.

In one embodiment, DOM builder 314 constructs JS elements. Once executing, the JS elements may construct and/or modify DOM elements and corresponding nodes within the view node tree, which may not have corresponding nodes within document node tree 310.

In one embodiment, DOM builder 314 constructs a browser agnostic DOM that does not depend on any particular browser, such as Internet Explorer, FireFox, Chrome, Safari, or Opera. In another embodiment, DOM builder 314 is selected such that the DOM is constructed based on a selected browser. DOM builder 314 may include an option for the user to select a particular browser, such as Internet Explorer, FireFox, Chrome, Safari, or Opera, on which to base the construction of the DOM. The constructed DOM is represented by browser 318. In one embodiment, browser 318 is a W3C compliant browser. In the example illustrated in FIG. 3, browser 318 displays a DOM element including the text "Hello" as defined by markup text 302.

The view node tree and document node tree 310 link the DOM elements within browser 318 to markup text 302. For example, by selecting or highlighting "Hello" within browser 318, the associated markup text within markup text 302 is selected or highlighted. Conversely, by selecting or highlighting "<p>Hello</p>" within markup text 302, the associated DOM element "Hello" in browser 318 is selected or highlighted.

DOM modification listener 322 tracks changes to DOM elements, such as DOM mutations, within browser 318. In one embodiment, DOM modification listener 322 tracks runtime modifications to DOM elements to mark text offsets within document node tree 310 as invalid or to replace text offsets within document node tree 310 with the execution location of JS responsible for creating and/or overwriting DOM elements and/or attributes. In one embodiment, DOM modification listener 322 tracks changes to DOM elements due to API 106 and/or script 108 (FIG. 1). In one embodiment, DOM modification listener 322 updates or inserts a node of the document node tree associated with the modified DOM element to indicate a line of the script responsible for the modification to the DOM element.

Figure 4:
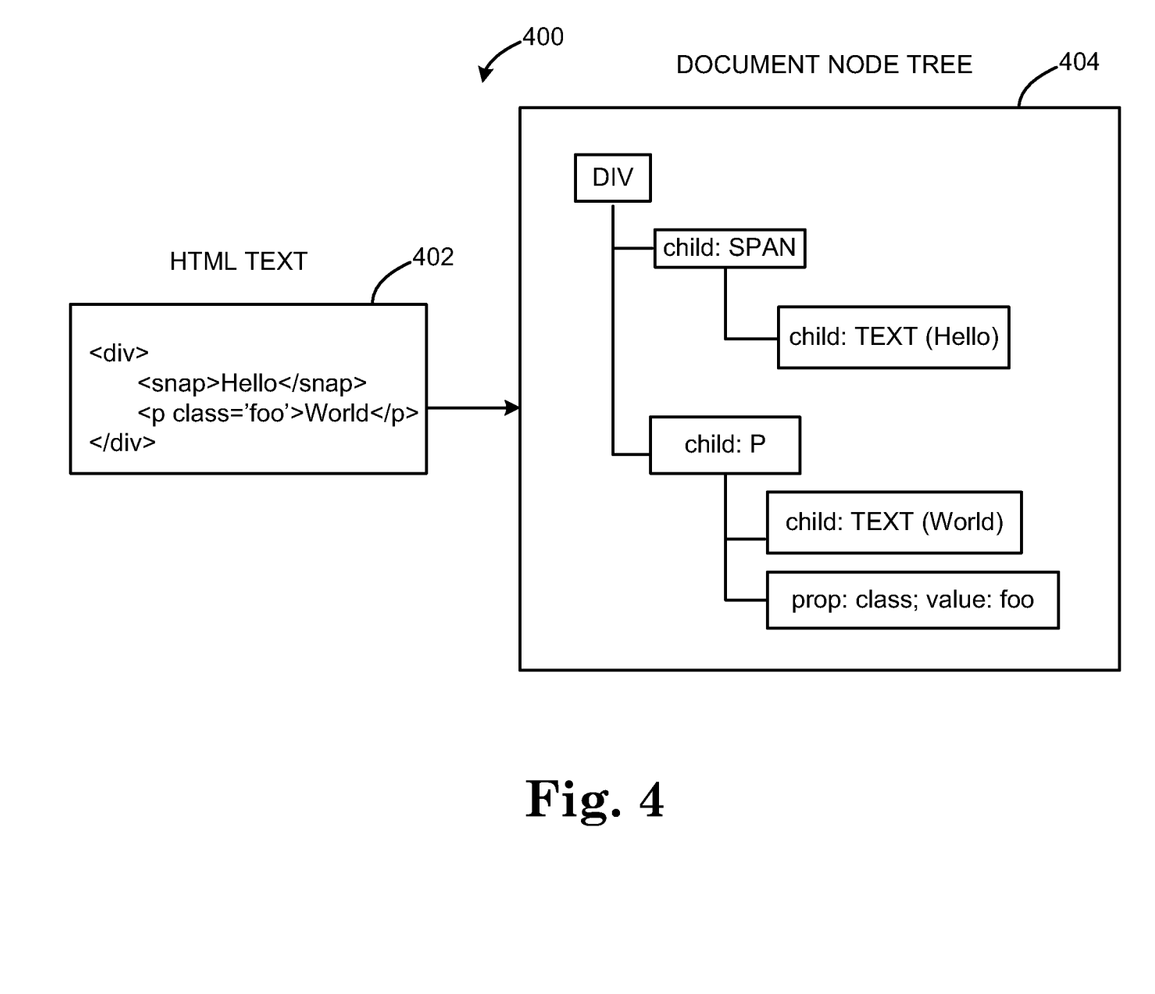
FIG. 4 is a block diagram illustrating one example of HTML text mapped to a document node tree.

FIG. 4 is a block diagram illustrating one example 400 of HTML text 402 mapped to a document node tree 404. To construct document node tree 404 from HTML text 402, HTML text 402 is parsed by a markup text parser, such a markup parser 306 previously described and illustrated with reference to FIG. 3. In the example illustrated in FIG. 4, HTML text 402 is parsed such that document node tree 404 includes a parent node "DIV" and child nodes "SPAN" and "P". Child node "SPAN" includes a further child node "TEXT(Hello)". Child node "P" includes a further child node "TEXT(World)" and a property of "class" with a value of "foo".

Thus, document node tree 404 maintains the HTML text 402 source document details in a structured tree format. As previously described and illustrated with reference to FIG. 3, document node tree 404 also includes the text offset for each parent and child node to indicate the specific location of the HTML text within HTML text 402 associated with each parent and child node, respectively.

Figure 5:
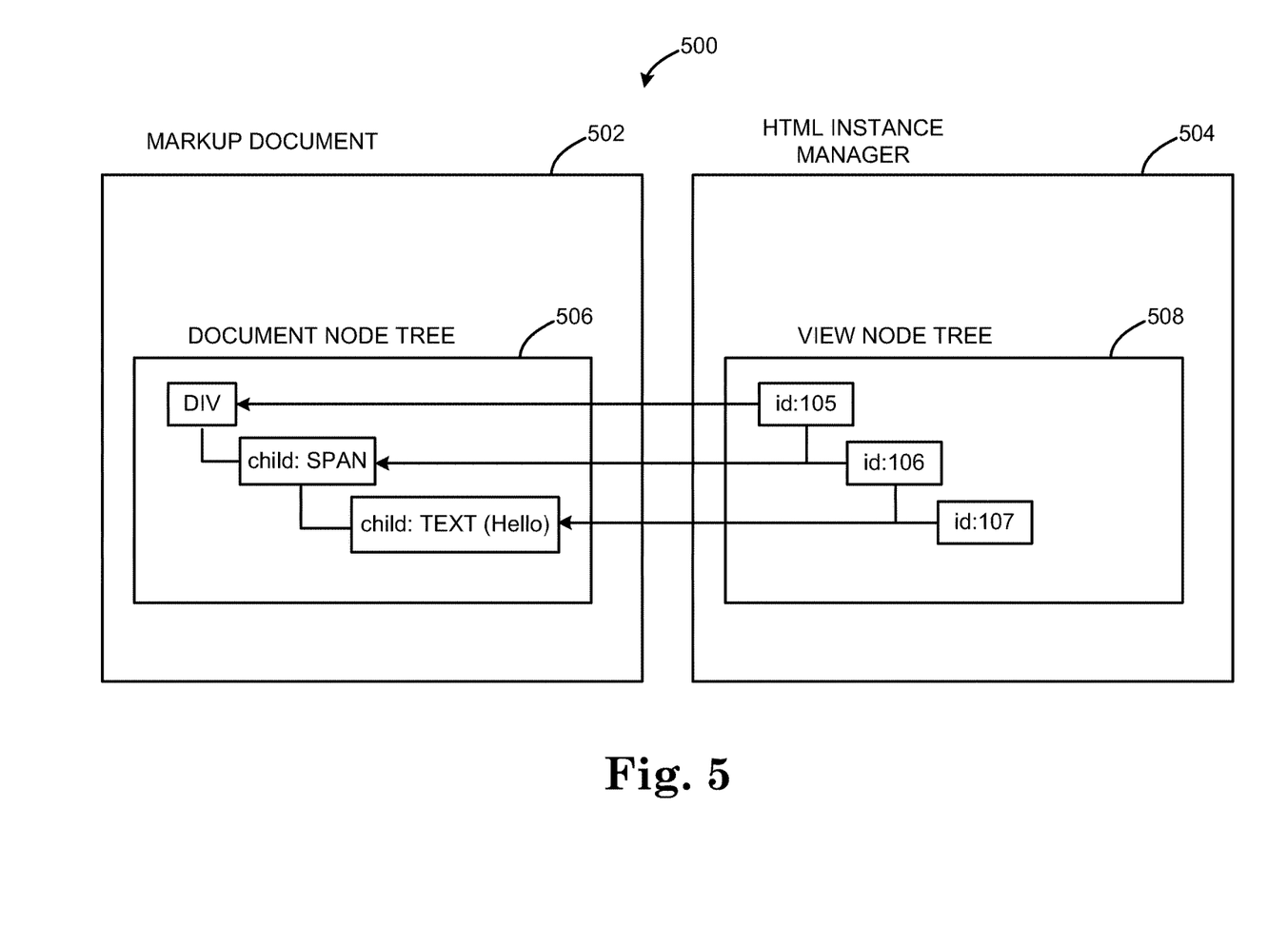
FIG. 5 is a block diagram illustrating one example of a document node tree mapped to a view node tree.

FIG. 5 is a block diagram illustrating one example 500 of a document node tree 506 mapped to a view node tree 508. Document node tree 506 provides the source document details for a markup document 502 in a structured tree format. View node tree 508 represents one instance of a DOM in an HTML instance manager 504. In one embodiment, HTML instance manager 504 can manage multiple instances of view node trees. In one embodiment, view node tree 508, which represents a DOM within HTML instance manager 504 is based on a selected browser. HTML instance manager 504 may include an option for the user to select a particular browser, such as Internet Explorer, FireFox, Chrome, Safari, or Opera, on which to base view node tree 508.

Each node of view node tree 508 includes an identifier that maps each node to an associated node in document node tree 506. In one embodiment, the identifier is assigned to each node of the view node tree by DOM builder 314 previously described and illustrated with reference to FIG. 3. In one embodiment, the identifier is a number. In the example illustrated in FIG. 5, identifier "105" of view node tree 508 is mapped to parent node "DIV" of document node tree 506. Likewise, identifier "106" is mapped to child node "SPAN" and identifier "107" is mapped to child node "TEXT(Hello)." Thus, each identifier of the view node tree links a node of the view node tree to an associated node in the document node tree.

Figure 6:
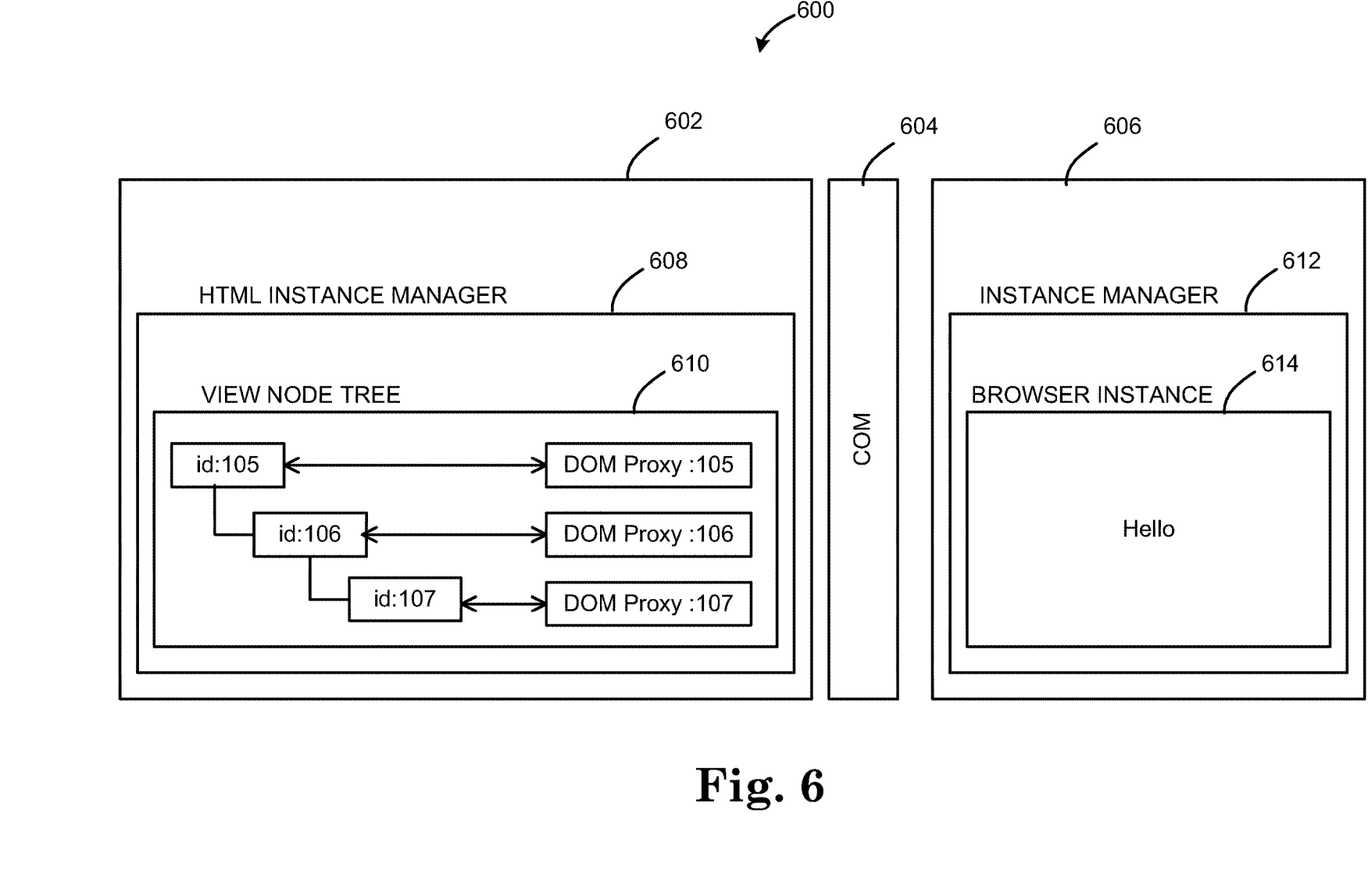
FIG. 6 is a block diagram illustrating one example of a view node tree for a DOM represented by a browser instance.

FIG. 6 is a block diagram illustrating one example 600 of a view node tree 610 for a DOM represented by a browser instance 614. An application 602 includes HTML instance manager 608, which manages view node tree 610. In one embodiment, HTML instance manager 608 manages multiple instances of view node trees. An application 606 includes an instance manager 612, which manages browser instance 614. In one embodiment, instance manager 612 manages multiple browser instances. Browser instance 614 represents an instance of a DOM. Application 602 is communicatively coupled to application 606 through a communication link (COM) 604.

The identifier of each node of view node tree 610 is linked to the associated DOM element represented by browser instance 614 as indicated by each "DOM Proxy" in view node tree 610. Thus, each DOM element represented by browser instance 614 is linked or mapped to a node of view node tree 610. Therefore, each DOM element represented in browser instance 614 is linked to the markup text in the markup text source document through the view node tree and the document node tree.

In the example illustrated in FIG. 6, identifier "105" of view node tree 610 is linked to a DOM proxy for identifier "105" of a DOM element represented by browser instance 614. Likewise, identifier "106" is linked to a DOM proxy for identifier "106" and identifier "107" is linked to a DOM proxy for identifier "107". In this example, view node tree 610 include the identifier "107" linking the child node "TEXT(Hello)" (FIG. 5) to the DOM element "Hello" within browser instance 614.

Figure 7:
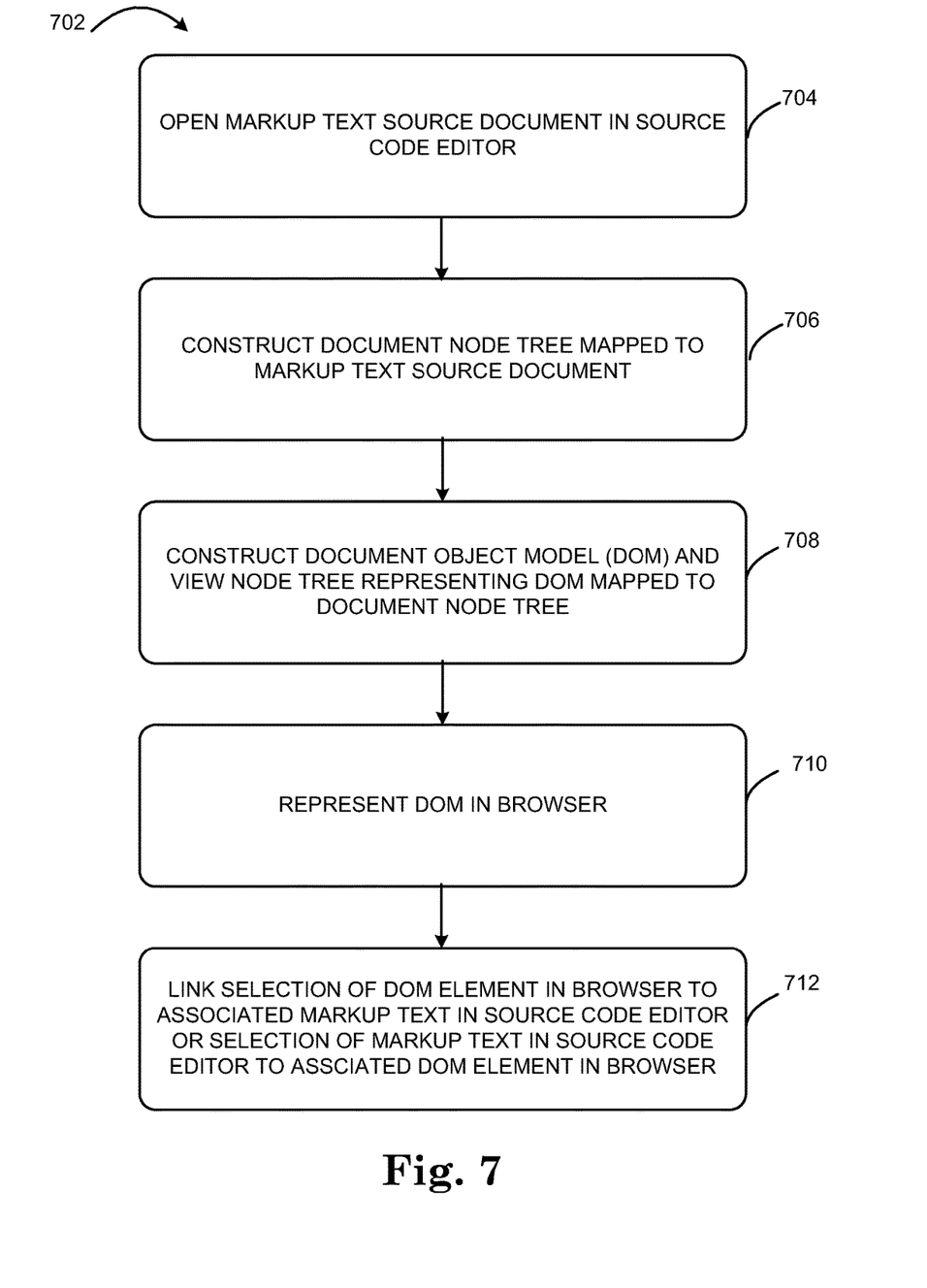
FIG. 7 is a flow diagram illustrating one embodiment of a method for linking markup text in a source code editor with associated DOM elements represented in a browser.

FIG. 7 is a flow diagram illustrating one embodiment of a method 702 for linking markup text in a source code editor with associated DOM elements in a browser. At 704, a markup text source document (e.g., markup text 302 previously described and illustrated with reference to FIG. 3) is opened in a source code editor. At 706, a document node tree (e.g., document node tree 310 previously described and illustrated with reference to FIG. 3) mapped to the markup text source document is constructed. At 708, a DOM and view node tree (e.g., view node tree 508 previously described and illustrated with reference to FIG. 5) representing the DOM mapped to the document node tree is constructed.

At 710, the DOM is represented in a browser (e.g., running representation 104 previously described and illustrated with reference to FIG. 1). At 712, a selection of a DOM element in the browser is linked to associated markup text in the source code editor or a selection of markup text in the source code editor is linked to the associated DOM element(s) in the browser. The link between the DOM elements and the associated markup text is provided via the view node tree and the document node tree.

Figure 8:
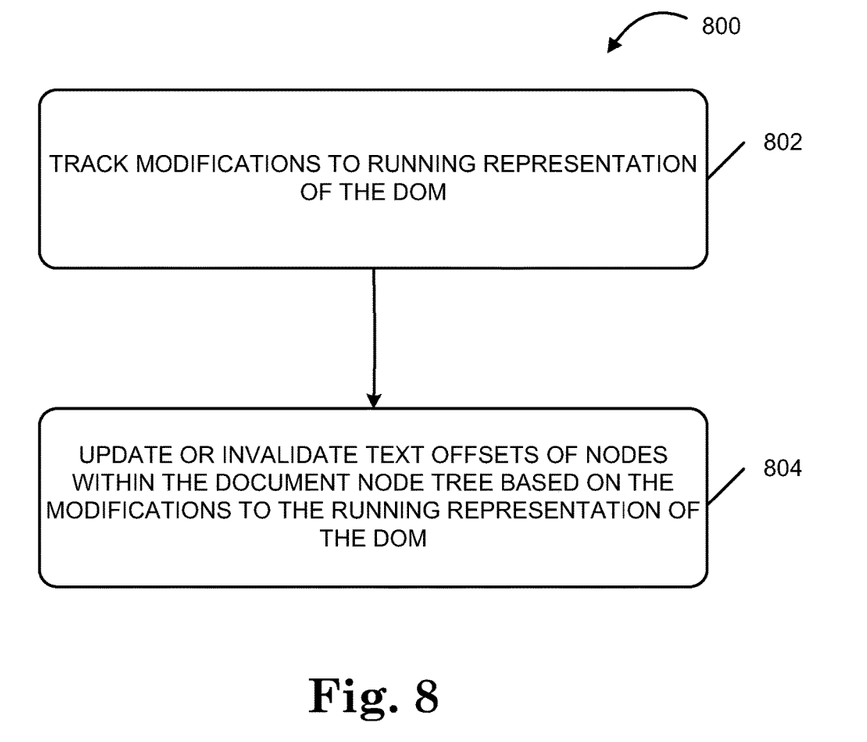
FIG. 8 is a flow diagram illustrating one embodiment of a method for updating or invalidating text offsets of nodes of a document node tree.

FIG. 8 is a flow diagram illustrating one embodiment of a method 800 for updating or invalidating text offsets of nodes of a document node tree. At 802, modifications to the running representation of the DOM are tracked. The modifications to the running representation of the DOM may be due to API 106, script 108 (FIG. 1), or other suitable processes. At 804, the text offsets of nodes within the document node tree are updated or invalidated based on the modifications to the running representation of the DOM. In one embodiment, the text offsets of corresponding nodes within the document node tree associated with modifications to the running representation of the DOM are updated to indicate the location of JS responsible for the modifications.

Embodiments provide a web development tool for linking DOM elements as represented in a browser with markup text in a markup text source document used to construct the DOM elements. The markup text source document is parsed to build up a DOM piece by piece such that a precise mapping between the original source code and the constructed DOM elements is maintained. Using the disclosed web development tool, a web page developer can immediately locate source code associated with selected DOM elements in a running page and immediately locate DOM elements in the running page associated with selected source code.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is clamed is:

1. A method comprising:
    selecting, within a web development tool, a browser from a plurality of browsers on which to base the construction of a Document Object Model (DOM);
    opening a text source document comprising original source code prior to being parsed in a source code editor;
    parsing the text source document to construct a document node tree such that the document node tree includes a text offset for each node of the document node tree, each text offset for each node indicating a location of associated original source code within the text source document corresponding to the node of the document node tree;
    constructing, from the document node tree, a DOM based on the selected browser and a view node tree that represents the DOM, the constructing of the view node tree including mapping the view node tree to the document node tree; and
    providing a running representation of the DOM such that each DOM element is linked to the associated original source code corresponding to the DOM element, the link provided via the view node tree and the text offsets in the document node tree,
    wherein the text offset for each node of the document node tree includes a line number and position within the line or a character number that indicates the position of a character relative to the beginning of the text source document, and wherein by selecting a DOM element within the running representation of the DOM, the original source code of the text source document associated with the selected DOM element is selected within the source code editor.

2. The method of claim 1, further comprising:
tracking a modification to a DOM element within the running representation of the DOM; and
one of marking the text offset for the node of the view node tree corresponding to the modified DOM element as invalid based on the modification and replacing the text offset for the node of the view node tree corresponding to the modified DOM element by an updated text offset based on the modification.

3. The method of claim 2, wherein tracking a modification comprises tracking a DOM mutation event.

4. The method of claim 2, wherein tracking a modification comprises tracking a modification via an Application Programming Interface (API) of the running representation of the DOM.

5. The method of claim 1, further comprising:
tracking a modification to a DOM element, the modification due to execution of script in the running representation of the DOM; and
one of updating and inserting a node of the document node tree associated with the modified DOM element to indicate a line of the script responsible for the modification to the DOM element.

6. The method of claim 1, wherein providing the running representation of the DOM comprises providing the running representation of the DOM in a browser instance.

7. The method of claim 1, wherein parsing the text source document comprises parsing the text source document with one of a HyperText Markup Language (HTML) parser and a Cascading Style Sheets (CSS) parser.

8. The method of claim 1, wherein parsing the text source document comprises parsing the text source document based on a parser of the selected browser.

9. The method of claim 1, wherein in response to selecting a portion of the text source document, a DOM element associated with the selected portion of the text source document is selected in the running representation of the DOM.

10. The method of claim 1, further comprising:
indicating portions of the text source document which are no longer represented in the running representation of the DOM due to modifications to the running representation of the DOM.

11. The method of claim 1, wherein in response to selecting a DOM element, the text offset associated with the DOM element is reported.

12. A computer readable non-transitory storage medium storing computer executable instructions for controlling a computing device to perform a method comprising:
selecting, within a web development tool, a browser from a plurality of browsers on which to base the construction of a Document Object Model (DOM);
opening a markup text source document comprising original source code prior to being parsed in a source code editor;
constructing a document node tree from the markup text source document such that each node of the document node tree includes a text offset and markup text source document details, the text offset in each node of the document node tree indicating a location of associated original source code within the markup text source document corresponding to the node of the document node tree;
constructing, from the document node tree, a DOM based on the selected browser and a view node tree that represents the DOM, the constructing of the view node tree including mapping the view node tree to the document node tree; and
representing the DOM in the browser such that each DOM element is linked to the associated original source code associated with the DOM element, the link provided via the view node tree and the text offsets in the document node tree,
wherein the text offset for each node of the document node tree includes a line number and position within the line or a character number that indicates the position of a character relative to the beginning of the markup text source document, and
wherein by highlighting a DOM element in the browser, the original source code of the markup text source document associated with the highlighted DOM element is highlighted in the source code editor.

13. The computer readable storage medium of claim 12, the method further comprising:
wherein by highlighting markup text in the source code editor, a DOM element associated with the highlighted markup text is highlighted in the browser.

14. The computer readable storage medium of claim 12, wherein constructing the document node tree comprises incrementally parsing the markup text source document via a markup text parser including a HyperText Markup Language (HTML) parser and a Cascading Style Sheets (CSS) parser.

15. The computer readable storage medium of claim 12, wherein mapping the view node tree to the document node tree comprises assigning an identifier to each node in the view node tree, each identifier of the view node tree mapped to a corresponding node in the document node tree.

16. A computer readable non-transitory storage medium storing a development tool including computer executable instructions for controlling a computing device, the development tool configured to perform a method comprising:
providing a source code editor for editing a markup text source document comprising original source code prior to being parsed;
selecting, within the development tool, a browser from a plurality of browsers on which to base the construction of a Document Object Model (DOM);
constructing a document node tree from the markup text source document via a markup text parser such that each node of the document node tree includes a text offset and source document details, the text offset in each node of the document node tree indicating a location of associated original source code within the markup text source document corresponding to the node of the document node tree; and
constructing, from the document node tree, a DOM based on the selected browser and a view node tree that represents the DOM, the view node tree mapped to the document node tree such that by selecting a DOM element in the browser, the original source code of the markup text source document associated with the selected DOM element is selected in the source code editor and such that by selecting original source code in the source code editor, the DOM element associated with the selected original source code is selected in the browser,
wherein the text offset for each node of the document node tree includes a line number and position within the line or a character number that indicates the position of a character relative to the beginning of the markup text source document.

17. The computer readable storage medium of claim 16, wherein the markup text parser comprises a HyperText Markup Language (HTML) parser and a Cascading Style Sheets (CSS) parser.

18. The computer readable storage medium of claim 16, wherein the view node tree is mapped to the document node tree by assigning an identifier to each node in the view node tree, each identifier of the view node tree mapped to a corresponding node in the document node tree.

19. The computer readable storage medium of claim 16, wherein providing the source code editor comprises providing a source code editor configured for editing multiple instances of markup text source documents,
   wherein the browser is configured for providing representations of multiple instances of DOMs.

20. The method of claim 1, further comprising:
   editing the text source document in the source code editor; and
   saving the edited text source document.

* * * * *